(12) United States Patent
Qian et al.

(10) Patent No.: US 11,604,916 B2
(45) Date of Patent: Mar. 14, 2023

(54) METHOD, SYSTEM, AND ELECTRONIC DEVICE FOR DETECTING OPEN/SHORT CIRCUIT OF PCB DESIGN LAYOUT (71) Applicant: VAYO (SHANGHAI) TECHNOLOGY CO., LTD., Shanghai (CN)

(72) Inventors: Shengjie Qian, Shanghai (CN); Fengshou Liu, Shanghai (CN)

(73) Assignee: VAYO (SHANGHAI) TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/296,230

(22) PCT Filed: Apr. 15, 2019

(86) PCT No.: PCT/CN2019/082645
§ 371 (c)(1),
(2) Date: May 22, 2021

(87) PCT Pub. No.: WO2020/103385
PCT Pub. Date: May 28, 2020

(65) Prior Publication Data
US 2022/0019723 A1    Jan. 20, 2022

(30) Foreign Application Priority Data

Nov. 23, 2018 (CN) .......................... 201811407159.X (51) Int. Cl.
*G06F 30/398* (2020.01)
*G06F 30/392* (2020.01)
(Continued)

(52) U.S. Cl.
CPC .......... *G06F 30/398* (2020.01); *G06F 30/392* (2020.01); *G06F 30/3953* (2020.01); *G06F 2115/12* (2020.01); *G06F 2119/02* (2020.01)

(58) Field of Classification Search
CPC .................................................... G06F 30/398
(Continued)

(56) References Cited

U.S. PATENT DOCUMENTS 9,147,034 B1 * 9/2015 Hawkins ............... G06F 30/398
2018/0189427 A1   7/2018 Brissenden et al.

FOREIGN PATENT DOCUMENTS

CN    104317998 A    1/2015
CN    104820766 A    8/2015
(Continued)

*Primary Examiner* — Eric D Lee
(74) *Attorney, Agent, or Firm* — Global IP Services; Tianhua Gu (57) ABSTRACT

A method for detecting an open/short circuit on a PCB design layout includes: reading PCB data of a to-be-checked PCB design layout, to output an image of each PCB layer included in the PCB design layout; performing a first connectivity analysis on the image of each PCB layer to classify pad patterns connected with each other in the same layer into a corresponding child network group; performing a second connectivity analysis to classify child network groups in which pad patterns connected by the same electroplated hole, into a corresponding parent network group; reading IPC netlist data of the PCB design layout, to obtain a netlist network group in which each pad pattern is; and determining whether a netlist network relationship of the pad patterns is consistent with a network relationship obtained after the second connectivity analysis in order to determine whether there is an open/short circuit.

16 Claims, 5 Drawing Sheets (51) Int. Cl.
  *G06F 30/3953* (2020.01)
  *G06F 115/12* (2020.01)
  *G06F 119/02* (2020.01)
(58) Field of Classification Search
  USPC ........................................................ 716/112
  See application file for complete search history.

(56) References Cited

FOREIGN PATENT DOCUMENTS

| | | |
|---|---|---|
| CN | 105740486 A | 7/2016 |
| CN | 106649895 A | 5/2017 |
| CN | 107590303 A | 1/2018 |
| CN | 109543307 A | 3/2019 |

* cited by examiner

Node: PIN, Part Name: Q1, "Pin Name 5, PiniD: 5", X:1.5579, Y: 1.220, Drll: 0, Copper 0.1736/0 Side: Top, Attribute: SMD, Net Name: N18289723, Net ID: 362

FIG. 7

METHOD, SYSTEM, AND ELECTRONIC DEVICE FOR DETECTING OPEN/SHORT CIRCUIT OF PCB DESIGN LAYOUT

CROSS REFERENCE TO RELATED PATENT APPLICATION

The present application is the US national stage of PCT/CN2019/082645 filed on Apr. 15, 2019, which claims the priority of the Chinese patent applications No. 201811407159.X filed on Nov. 23, 2018, which application is incorporated herein by reference.

FIELD OF TECHNOLOGY

The present disclosure relates to the technical field of printed circuit boards, in particular, to a method, system, and electronic device for detecting open/short circuit of PCB design layout.

BACKGROUND

A printed circuit board (PCB) is a carrier of various electronic components. PCBs are used in almost all modern electronic products. With continuous development of technology and PCB industry's manufacturing capability, electronic products are becoming lighter, thinner, and smaller, pushing PCB develop towards high density, small components, fine pitch and more layers, which makes PCB quality inspection increasingly challenging.

A PCB design layout is the last step in circuit design. After a PCB layout is completed, bare board manufacturing of the PCB starts. The bare board manufacturing of the PCB is completed on the basis of PCB design data (Gerber files and hole data). Therefore, the PCB design layout is the premise and foundation of PCB manufacturing, and quality of the design determines the quality of the entire PCB and even the electronic product. In addition, the most likely quality issue of a PCB design layout is the open/short circuit of the resulting PCB circuits, which needs to be resolved by every PCB designer and PCB bare board manufacturer.

Generally, reasons for the open/short circuits of a PCB circuit include the following:

1. There is an error in PCB design data output from PCB layout software (for example, there is a bug in Gerber file or the PCB layout design is incorrect), and therefore, the connection relationship of the designed layout is different from that of a preliminary netlist, resulting in an open/short circuit.

2. Based on manufacturing process of bare board, the manufacturer makes appropriate modifications to the PCB design data (for example, the Gerber file) before manufacturing the bare board, so that the actually manufactured PCB bare board can achieved a certain designed function. However, in the process of modification, an open/short circuit of the circuit may occur.

Because the PCB bare board is manufactured according to the PCB design data, the open/short circuit in the PCB circuit can be effectively mitigated or even avoided only by ensuring accuracy of the PCB design data. Hence, it is of great significance to ensure the accuracy of the PCB design data.

SUMMARY

In view of the foregoing disadvantages of the prior art, an advantage of the present disclosure is that it provides a method, system and electronic device for detecting an open/short circuit on a PCB design layout, to quickly and efficiently verify whether the PCB design data is consistent with the preliminary netlist during layout and further ensure accuracy of the PCB design data.

To achieve the foregoing and other related objectives, a method for detecting an open/short circuit on a PCB design layout is provided, which includes: reading PCB data of a to-be-checked PCB design layout, to output an image of each PCB layer included in the PCB design layout; performing a first connectivity analysis on the mentioned image of each PCB layer to classify pad patterns connected with each other in the same layer into one group; performing a second connectivity analysis on plated hole of drill layer of mentioned PCB design layout to classify child network groups in which pad patterns connected by the same electroplated hole, into a corresponding parent network group; reading IPC netlist data of the PCB design layout, to obtain a netlist network group in which each pad pattern is; and determining whether a netlist network relationship of each mentioned pad pattern is consistent with the network relationship obtained after the second connectivity analysis in order to determine whether there is an open/short circuit. If the netlist network relationship of the pad patterns is consistent with the network relationship obtained after the second connectivity analysis, it's determining that there is no open/short circuit in the PCB design layout. Otherwise, if the netlist network relationship of the pad patterns is inconsistent with the network relationship obtained after the second connectivity analysis, it's determining that there is an open/short circuit in the PCB design layout.

In an embodiment of the present disclosure, the step of determining whether there is an open/short circuit in the PCB design layout based on the netlist network relationship of the pad patterns and the network relationship obtained after the second connectivity analysis further comprises: if pad patterns in the same netlist network group are not in the same parent network group, determining that there is an open circuit in the PCB design layout and the open circuit occurs in the netlist network group; if the pad patterns in the same parent network group are not in the same netlist network group, determining that there is a short circuit in the PCB design layout and the short circuit occurs in the parent network group; or if the pad patterns in the same netlist network group are also in the same parent network group or pad patterns in the same parent network group are also in the same netlist network group, determining that there is no open/short circuit in the PCB design layout.

In an embodiment of the present disclosure, the method further comprises: outputting an image of the IPC netlist data, wherein the IPC netlist data comprises coordinates of each pad pattern; searching the IPC netlist data for coordinates of pad patterns in the network group with the open/short circuit; and highlighting positions on the image of the IPC netlist data according to the coordinates found.

In an embodiment of the present disclosure, the system further comprises a check report generation module for generating a check report. The check report comprises identification information of each pad pattern, information about the netlist network group in which the pad pattern is, information about the parent network group in which the pad pattern is, and a check result To achieve the foregoing and other related objectives, a system for detecting an open/short circuit on a PCB design layout is provided. The system comprises: a PCB data reading module, configured to input PCB data of a to-be-checked PCB design layout, to output an image of each PCB layer comprised in the PCB design layout; a connectivity analyzing module, configured to perform a first connectivity analysis on the image of each PCB layer, to classify pad patterns in contact with each other in a same layer into a same child network group; and perform a second connectivity analysis on each electroplated hole of a drill layer of the PCB design layout, to classify child network groups in which pad patterns that are connected by the electroplated holes running through different PCB layers are, into a same parent network group; an IPC netlist data reading module, configured to read IPC netlist data of the PCB design layout, to obtain a netlist network group in which each pad pattern is; and an open/short circuit detecting module, configured to: determine whether a netlist network relationship of the pad patterns is consistent with a network relationship obtained after the second connectivity analysis; and if the netlist network relationship of the pad patterns is consistent with the network relationship obtained after the second connectivity analysis, determine that there is no open/short circuit in the PCB design layout; or if the netlist network relationship of the pad patterns is inconsistent with the network relationship obtained after the second connectivity analysis, determine that there is an open/short circuit in the PCB design layout.

In an embodiment of the present disclosure, the open/short circuit detecting module is further configured to: determine that there is an open circuit in the PCB design layout and the open circuit occurs in the netlist network group, when pad patterns in the same netlist network group are not in the same parent network group; determine that there is a short circuit in the PCB design layout and the short circuit occurs in the parent network group, when pad patterns in the same parent network group are not in the same netlist network group; or determine that there is no open/short circuit in the PCB design layout, when pad patterns in the same netlist network group are also in the same parent network group or pad patterns in the same parent network group are also in the same netlist network group.

In an embodiment of the present disclosure, the IPC netlist data reading module is further configured to: output an image of the IPC netlist data, the IPC netlist data comprises coordinates of each pad pattern. The system further comprises a highlighting module, configured to search the IPC netlist data for coordinates of pad patterns in the network group with the open/short circuit, and highlight positions on the image of the IPC netlist data according to the coordinates found.

In an embodiment of the present disclosure, the system further comprises a check report generation module, configured to generate a check report, wherein the check report comprises identification information of each pad pattern, information about the netlist network group in which the pad pattern is, information about the parent network group in which the pad pattern is, and a check result. The present disclosure also provides a storage medium storing a computer program, where when the computer program is loaded and executed by a processor, the method for detecting an open/short circuit on a PCB design layout is implemented.

The present disclosure also provides an electronic device, comprising: a processor and a memory, where the memory is configured to store a computer program; and the processor is configured to load and execute the computer program in order to enable the electronic device to execute the method for detecting an open/short circuit on a PCB design layout.

As mentioned above, the method, system and electronic device for detecting an open/short circuit on a PCB design layout of the present disclosure automatically and intelligently implement the open/short circuit detection on the PCB design layout before the PCB bare board is manufactured, thereby reducing workload of open/short circuit detection on finished PCB products by using detection device. The present disclosure can be applied in PCB design house and bare board manufacturing plant, to effectively prevent open/short circuit defects of manufactured PCB bare boards, thereby preventing a large quantity of PCB bare boards from being scrapped. The present disclosure further objectively improves production efficiency of bare board manufacturing plant, thereby having advantages such as reducing enterprise loss and risk, and improving overall competitiveness.

DETAILED DESCRIPTION

Implementations of the present disclosure are described in the following by using specific embodiments. Those skilled in the art can easily understand other advantages and effects of the present disclosure through contents disclosed in this specification. The present disclosure may alternatively be implemented or applied by using other different specific implementations. Various details in this specification may also be modified or changed based on a different idea or application without departing from the spirit of the present disclosure.

It should be noted that, figures provided in the present embodiments merely describe a basic concept of the present disclosure in a schematic manner, and therefore, the figures only show components related to the present disclosure, and are not drawn according to the numbers, shapes, and sizes of the components in an actual implementation. In an actual implementation, the shapes, numbers, and scales of the components may be a random change, and a layout of the components may be more complex.

Figure 1:
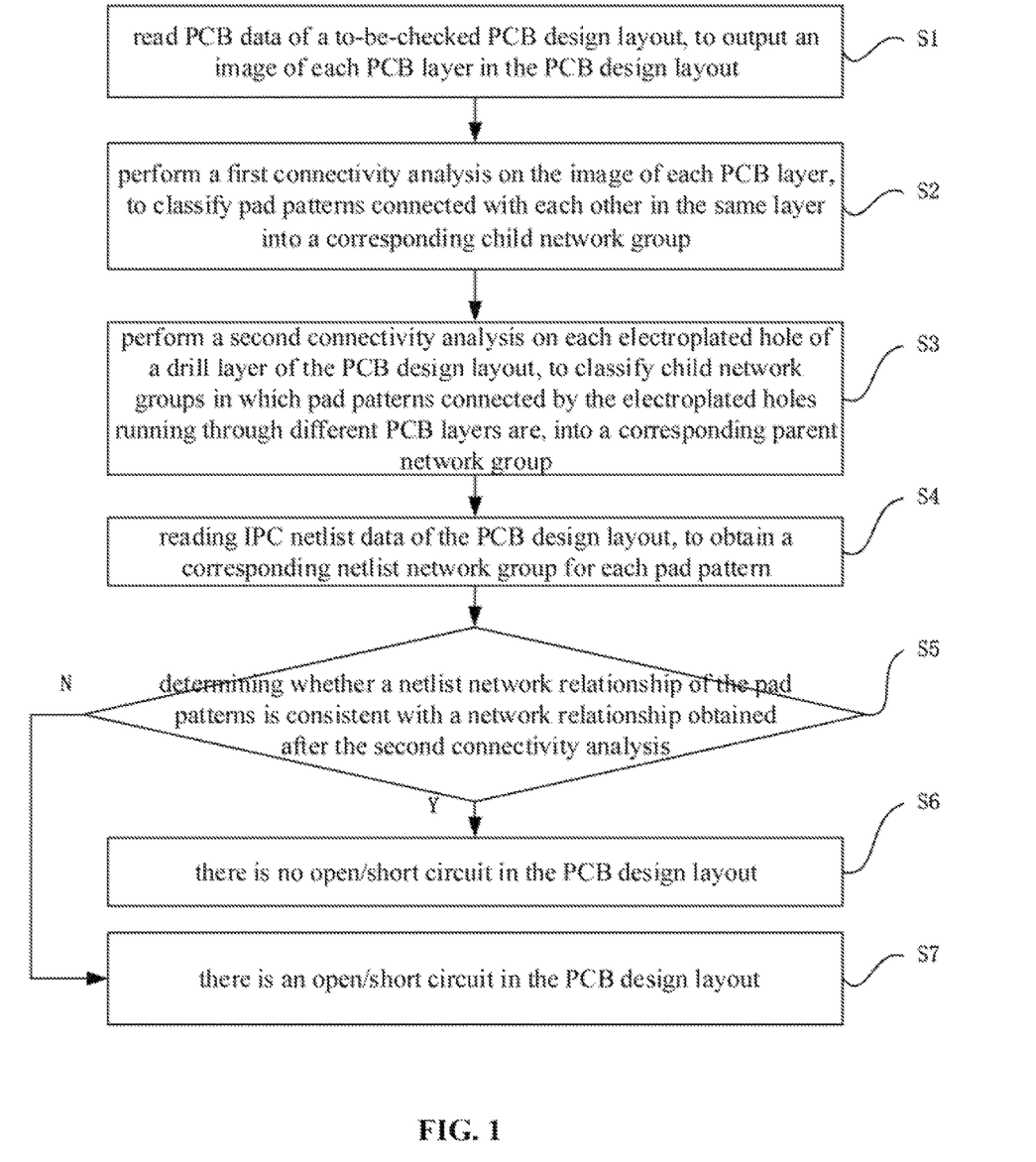
FIG. 1 is a schematic flowchart of a method for detecting an open/short circuit on a PCB design layout according to an embodiment of the present disclosure.

As shown in FIG. 1, the present disclosure provides a method for detecting an open/short circuit on a PCB design layout including the following steps.

S1. Input PCB data of a to-be-checked PCB design layout, to output an image of each PCB layer in the PCB design layout.

Figure 2:
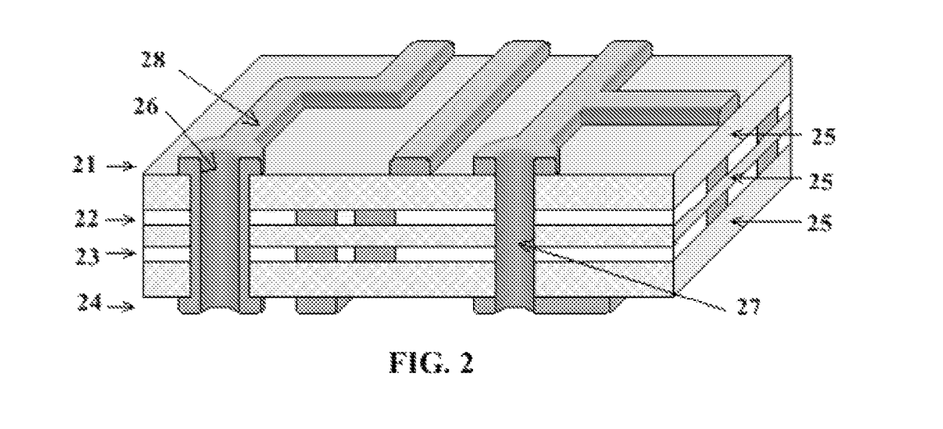
FIG. 2 is a schematic structural diagram of a PCB physical layer.

The input PCB data is physical layer data required to manufacture a PCB bare board. The physical layer comprises: front signal layer, middle signal layer (the number of middle layers is between 0 and n), back signal layer, and drill layer. The drill layer may comprise several files, including electroplated hole and non-electroplated hole, and there may be several files for electroplated and non-electroplated hole through different layers. File formats of the PCB data include but are not limited to Gerber/Barco DPF/MDA. FIG. 2 shows a copper foil pattern of the front signal layer. Based on actual PCB layer, the sequence of PCB layer output according to PCB data is as follows: the front signal layer 21, middle signal layers 22 and 23, and the back signal layer 24. Insulating layers 25 are provided between the front signal layer 21 and the middle signal layer 22, between the middle signal layer 22 and the middle signal layer 23, and between the middle signal layer 23 and the back signal layer 24 for isolation. An electroplated hole 26 and a non-electroplated hole 27 respectively run through the front signal layer 21, the middle signal layers 22 and 23, the back signal layer 24, and the insulating layers 25. The electroplated hole 26 connects the front signal layer 21 to the back signal layer 24, and the non-electroplated hole 27 does not connect layers through which the non-electroplated hole 27 runs. A reference number 28 represents the copper foil.

Figure 3A:
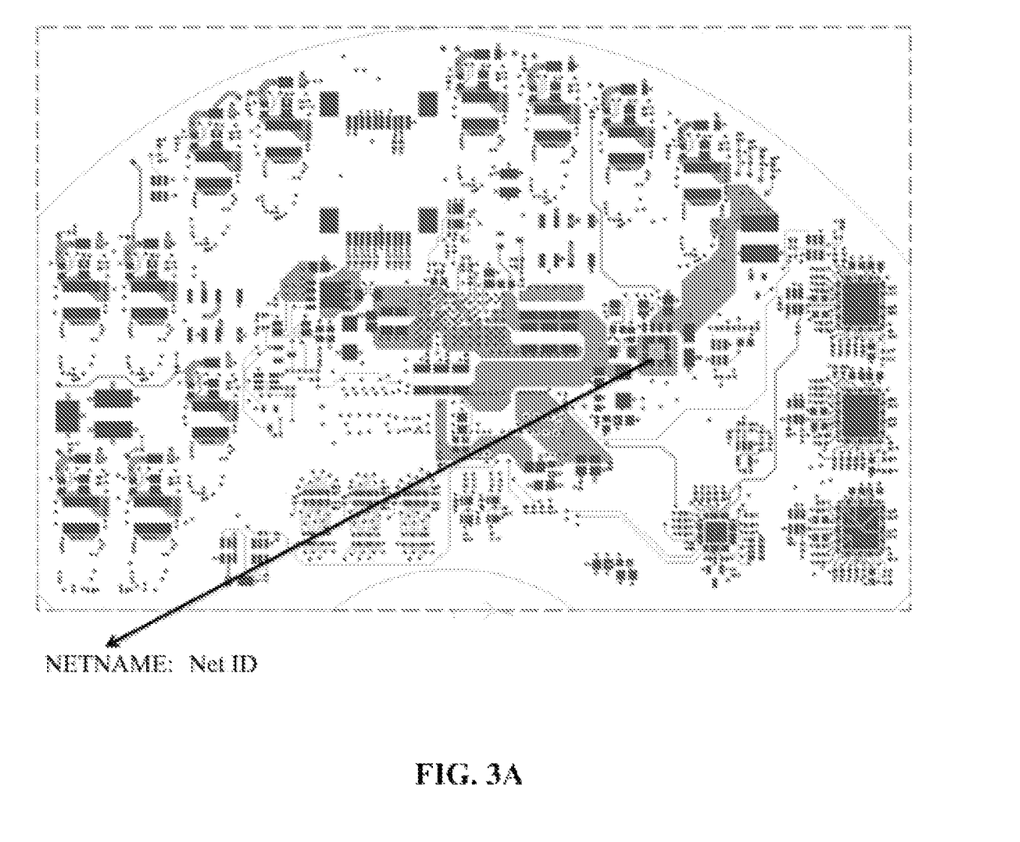
FIG. 3A shows an image output based on input PCB data according to an embodiment of the present disclosure.
Figure 3B:
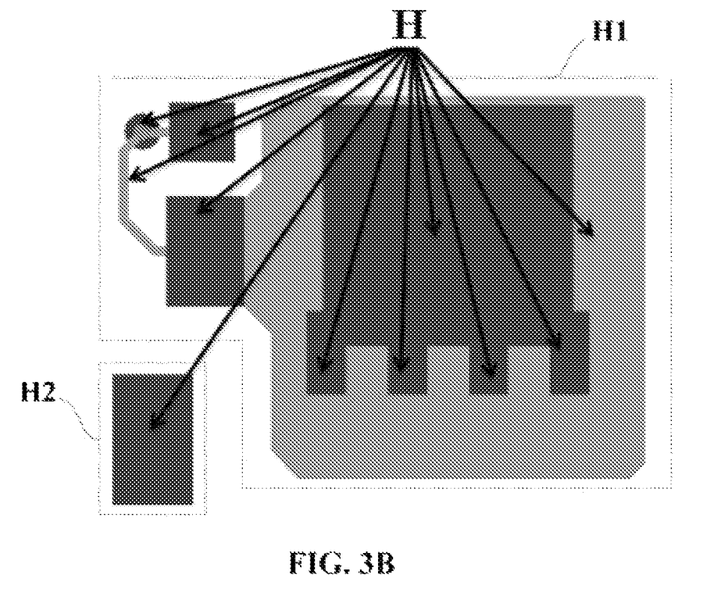
FIG. 3B is a partial enlarged drawing of part H in FIG. 3A.

FIG. 3A shows an image of each PCB layer output according to PCB data of the to-be-checked PCB design layout. FIG. 3B is a partial enlarged view of part H in FIG. 3A. Because the connectivity analysis haven't been performed yet at this time, pad patterns on the PCB layer are not regrouped, "NETNAME" is vacant, and the network relationship between the pad patterns is not redefined.

S2. Perform a first connectivity analysis on the image of each PCB layer, to classify pad patterns connected with each other in each layer into one child network group.

The first connectivity analysis is the first stage of the connectivity analysis. In this stage, an image processing algorithm is used to analyze whether the pad patterns in FIG. 3A are connected to each other. Taking part H as an example and referring to FIG. 3B, after an image analysis, it is concluded that pad patterns in an area H1 are connected to each other, while pad patterns in the area H2 are separated from the pad patterns in the area H1. Therefore, after the first connectivity analysis, the pad patterns in the area H1 are classified into one child network group 1, the pad patterns in the area H2 are classified into another child network group 2, and so on.

S3. Perform a second connectivity analysis on each electroplated hole of a drill layer of the PCB design layout, to classify child network groups which pad patterns connected by the same electroplated hole running through different PCB layers are in, into one parent network group.

The second connectivity analysis is the second stage of the connectivity analysis. In this stage, a connection relationship between layers is analyzed. In step S1, after PCB data of the drill layer is read, whether the drill layer is electroplated is identified, and associated layers through which the electroplated drill layer runs are identified. Subsequently, during the second connectivity analysis, child network groups in which the pad patterns of different PCB layers connected by the same electroplated hole are, are classified into one parent network group. For example, after the first connectivity analysis, the pad patterns on the front signal layer are classified into child network group 1, child network group 2, and child network group 3; and pad patterns on the back signal layer are classified into child network group 1', child network group 2', and child network group 3'. Because the electroplated hole runs through the front signal layer and the back signal layer, the child network group 1 and the child network group 1' are classified into the same parent network group NET1, the child network group 2 and the child network group 2' are classified into one parent network group NET2, and the child network group 3 and the child network group 3' are classified into one parent network group NET3, and so on.

Figure 4:
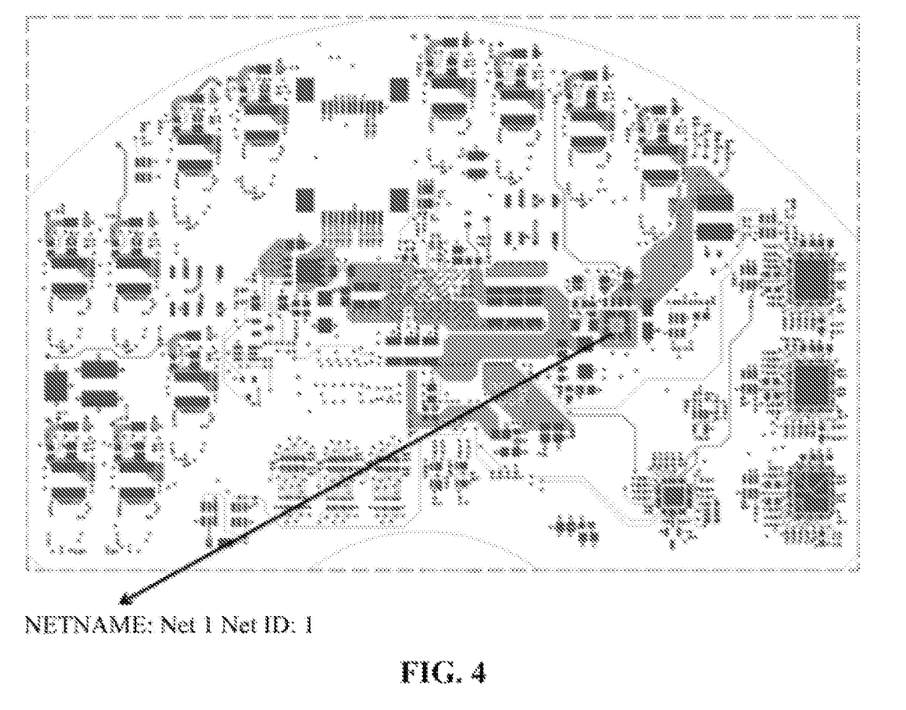
FIG. 4 shows an output image of FIG. 3 after a connectivity analysis.

As shown in FIG. 4, in this way, an originally vacant pad pattern "NETNAME" in FIG. 3 is given the parent network group name of "Net1".

It should be noted that after the parent network group is determined, the connectivity analysis is then completed. At this time, the network relationship of the pad patterns formed after the connectivity analysis is accordingly determined.

S4. Read IPC netlist data of the PCB design layout, to obtain a corresponding netlist network group for each pad pattern.

The IPC netlist data comprises IPC-D-356 netlist data or similar data. The IPC-D-356 netlist data comprises network names and coordinates of all pad patterns on the front and back signal layers of the PCB. In other words, according to those netlist data of industrial standards, each pad pattern has a netlist network name. If names of netlist networks of two pad patterns are the same, the pad patterns can be regarded as in the same netlist network group, and the netlist network relationship of the pad patterns is determined accordingly.

Figure 5:
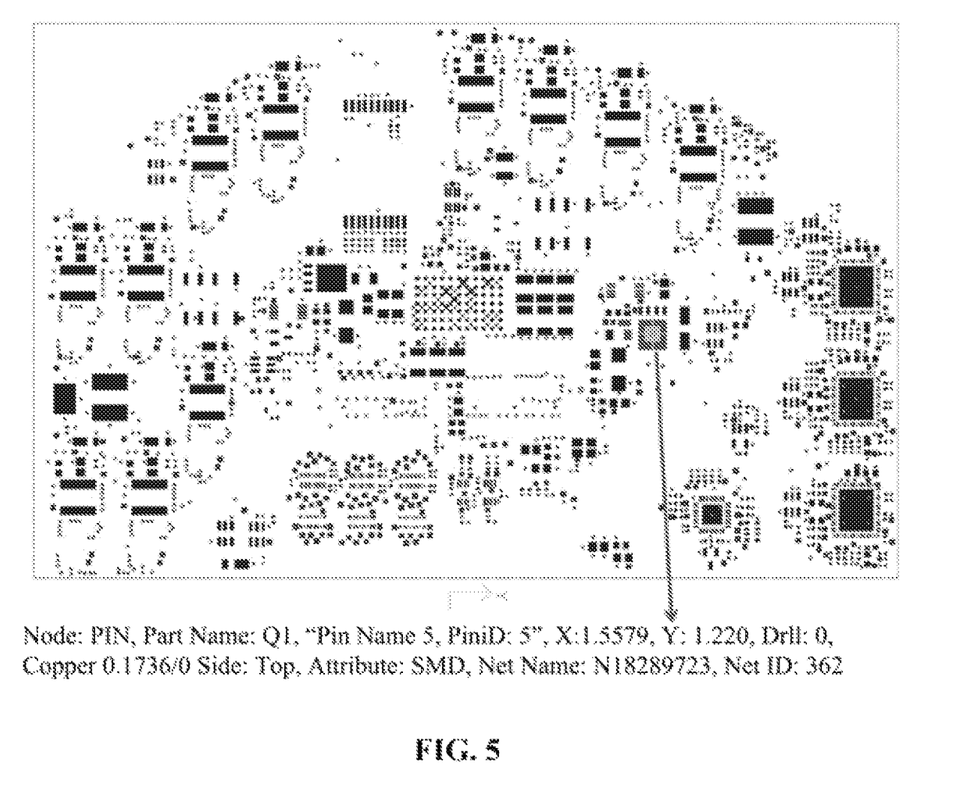
FIG. 5 shows an image output based on input IPC netlist data according to an embodiment of the present disclosure.

FIG. 5 shows an output image of each PCB layer that is comprised in IPC netlist data of the to-be-checked PCB design layout. The netlist network name (NetName) of the highlighted pad pattern is "N18289723".

S5. Determine whether the netlist network relationship of the pad patterns is consistent with the network relationship obtained after the second connectivity analysis; and if they are consistent with each other, perform step S6; otherwise, perform step S7.

Before the connectivity analysis, the network relationship among pad patterns is formed by the relationship between the netlist network groups; while, after the connectivity analysis, the network relationship is formed by the relationship between the parent network groups. Specifically, if the pad patterns in the same netlist network group are also in the same parent network group after the connectivity analysis, or if the pad patterns in the same parent network group are also in the same netlist network group, it indicates that the former and latter network relationships are consistent; or if the pad patterns in the same netlist network group are not in the same parent network group after the connectivity analysis, or if the pad patterns in the same netlist network group are not in the same parent network group, it indicates that the former and latter network relationships is inconsistent.

S6. Determine that there is no open/short circuit in the PCB design layout.

Specifically, if the pad patterns in the same netlist network group are also in the same parent network group or the pad patterns in the same parent network group are also in the same netlist network group, it is determined that there is no open/short circuit in the PCB design layout.

S7. Determine that there is an open/short circuit in the PCB design layout.

Specifically, if the pad patterns in the same netlist network group are not in the same parent network group, it is determined that there is an open circuit in the PCB design layout and the open circuit occurs in the netlist network group, and the specific location of the open circuit may be in those pad patterns of which parent network group name are inconsistent with that of other pad patterns in the netlist network group, or may be at a specific circuit or a specific hole of the netlist network group. If the pad patterns in the same parent network group are not in the same netlist network group, it is determined that there is a short circuit in the PCB design layout and the short circuit occurs in the parent network group, and the specific location of the short circuit may be in those pad patterns of which netlist network group name are inconsistent with that of other pad patterns in the parent network group, or may be at a specific circuit or a specific hole of the parent network group.

In an embodiment, the method further comprises the step of generating a check report. The check report comprises identification information of each pad pattern, information about the netlist network groups, information about the parent network groups, and check results.

For example, see Table 1:

TABLE 1

| Netlist pattern number | Network name 1 | PCB data pattern number | Network name 2 | Determine whether there is an open/short circuit |
|---|---|---|---|---|
| 1 | A18289723 | 121 | NET1 | OK |
| 2 | A18289723 | 12 | NET1 | OK |
| 3 | A18289723 | 143 | NET1 | OK |
| 4 | A18289723 | 154 | NET1 | OK |
| 5 | A18289723 | 105 | NET1 | OK |
| 6 | A18289723 | 176 | NET3 | There is an open circuit in this network |
| 7 | GND | 187 | NET3 | OK |
| 8 | GND | 98 | NET3 | OK |
| 9 | GND | 209 | NET3 | OK |
| 10 | GND | 220 | NET3 | OK |
| 11 | GND | 231 | NET3 | OK |
| 13 | VCC | 253 | NET6 | OK |
| 14 | VCC | 264 | NET6 | OK |
| 12 | VCC | 242 | NET3 | There is an open circuit in this network |
| 15 | VCC | 2333 | NET22 | There is an open circuit in this network |

Table 1 is sorted with the network name 1 as the main keyword. The "network name 1" is the name of the "netlist network group" mentioned above; Table 1 is then sorted with the network name 2 as the second keyword. In the column of network name 2, the network name 1 that appears most frequently ranks ahead. The "network name 2" refers to the names of the "parent network group" mentioned above. For example, in Table 1, "NET1" is the most frequent network name 2 corresponding to "A18289723", and therefore, "NET1" ranks first and "NET3" ranks behind "NET1"; and "NET6" is the most frequent network name 2 corresponding to "VCC", and therefore, "NET6" ranks first, and "NET3" and "NET22" follows.

The pad patterns with PCB data pattern numbers "121", "12", "143", "154", "105", and "176" are all in the group "A18289723" before the connectivity analysis, and after the connectivity analysis, the first five pad patterns are in the group "NET1" and the last pad pattern is in the group "NET3". For the first five pad patterns, the network relationships are kept unchanged before and after the connectivity analysis, and for the last pad pattern, its before and after network relationships are not consistent. Therefore, there is an open circuit in the group "A18289723", and the pad pattern "176" may be the specific location where the open circuit occurs.

The pad patterns with PCB data pattern numbers "187", "98", "209", "220", and "231" are all in a group "GND" before the connectivity analysis, and are all in the group "NET3" after the connectivity analysis. Their before and after network relationships are kept unchanged. Therefore there is no open/short circuit in the group "GND".

The pad patterns with PCB data pattern numbers of "253", "264", "242", and "2333" are all in a group "VCC" before the connectivity analysis, and after the connectivity analysis, the first two pad patterns are in the group "NET6", while the pad pattern "242" is in the group "NET3", and the pad pattern "2333" is in the group "NET22". For the first two pad patterns, the network relationships are kept unchanged, and for the last two pad patterns, the relationships are no longer consistent. Therefore, there is an open circuit in the group "VCC", and the pad patterns "242" and "2333" may be the specific locations where the open circuit occurs.

For another example, see Table 2:

TABLE 2

| PCB data pattern number | Network name 2 | Netlist pattern number | Network name 1 | Determine whether there is an open/short circuit |
|---|---|---|---|---|
| 187 | NET3 | 7 | GND | OK |
| 98 | NET3 | 8 | GND | OK |
| 209 | NET3 | 9 | GND | OK |
| 220 | NET3 | 10 | GND | OK |
| 231 | NET3 | 11 | GND | OK |
| 176 | NET3 | 6 | A18289723 | There is a short circuit in this network |
| 242 | NET3 | 12 | VCC | There is a short circuit in this network |
| 121 | NET1 | 1 | A18289T23 | OK |
| 12 | NET1 | 2 | A18289T23 | OK |
| 143 | NET1 | 3 | A18289723 | OK |
| 154 | NET1 | 4 | A18289T23 | OK |
| 105 | NET1 | 5 | A18289T23 | OK |
| 253 | NET6 | 13 | VCC | OK |
| 264 | NETS | 14 | VCC | OK |
| 2333 | NET22 | 15 | VCC | OK |

Table 2 is sorted with the network name 2 as the main keyword. The "network name 2" refers to the names of the "parent network group" mentioned above; Table 2 is then sorted with the network name 1 as the second keyword. In the column of network name 1, the network name 2 that appears most frequently ranks ahead. The "network name 1" refers to the names of the "netlist network group" mentioned above. In Table 2, "NET3" is the most frequent network name 1 corresponding to "GND", and therefore, "GND" ranks first, and "A18289723" and "VCC" rank behind.

It should be noted that a PCB data pattern number identifies a pad pattern in a "parent network group", and a netlist pattern number identifies a pad pattern in a "netlist network group". In other words, the pad pattern with the PCB data pattern number "187" actually refers to the pad pattern with the netlist pattern number of "7", and so on. In the analysis of Table 1, the pad pattern is identified by using the "PCB data pattern number" by default. Certainly, this is equivalent to identifying the pad pattern by using the "netlist pattern number".

The "netlist pattern numbers" of the pad patterns are used below to describe the process of determining a short circuit.

For the pad patterns with the netlist pattern numbers of "6" to "12", before the connectivity analysis, the pad patterns "7" to "11" are in the group "GND", the pad pattern "6" is in the group "A18289723", and the pad pattern "12" is in the group "VCC". After the connectivity analysis, the pad patterns are all in the group "NET3". For the pad patterns "7" to "11", the before and after network relationships are kept unchanged, and for the pad patterns "6" and "12", the network relationships are not consistent. Therefore, there is a short circuit in the group "NET3", and the pad patterns "6" and "12" may be the specific locations in which the short circuit occurs.

For pad patterns with netlist pattern numbers "1" to "5", they are all in a group "A18289723" before the connectivity analysis, and are all in the group "NET1" after the connectivity analysis. Their relationships are kept unchanged. Therefore there is no short circuit in the group "NET1".

The pad patterns with netlist pattern numbers of "13" and "14" are all in the group "VCC" before the connectivity analysis, and are all in the group "NET6" after the connectivity analysis. The network relationships are kept unchanged and therefore there is no short circuit in the group "NET6".

In an embodiment, the IPC netlist data further comprises coordinates of each pad pattern. At step S7, when it is determined that there is an open/short circuit in a specific netlist network group, the output image of the IPC netlist data shown in FIG. 5 and the image shown in FIG. 4 are overlapped to search the IPC netlist data for coordinates of the pad pattern in which the open/short circuit appears, and highlight the locations corresponding to the coordinates on the image in the IPC netlist data, thereby making it convenient to locate the cause(s) of an open/short circuit.

It should be noted that the protection scope of method for detecting an open/short circuit on a PCB design layout elaborated in the present disclosure is not limited to the execution sequence of the steps listed herein, and all the solutions implemented by modifying the prior art through adding or omitting steps based on the principles of the present disclosure are within the protection scope of the present disclosure.

All or some of the steps for implementing the foregoing method can be completed by hardware related to a computer program. Based on such understanding, the present disclosure further provides a computer program product, comprising one or more computer instructions. The computer instruction may be stored in a computer-readable storage medium. The computer-readable storage medium may be any computer medium available for storage, or a data storage device, such as a server or a data center, comprising one or more usable media. The usable medium may be a magnetic medium (for example, a soft disk, a hard disk, or a magnetic tape), an optical medium (for example, a DVD), a semiconductor medium (for example, a solid state disk (Solid State Disk, SSD)), or the like.

Figure 6:
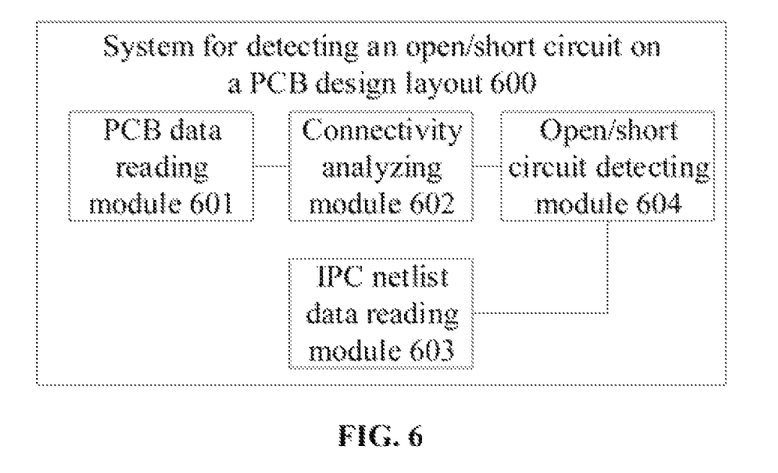
FIG. 6 is a schematic diagram of modules of a system for detecting an open/short circuit on a PCB design layout according to an embodiment of the present disclosure.

Referring to FIG. 6, the present disclosure provides a system 600 for detecting an open/short circuit on a PCB design layout, which is embedded into an electronic device as software, to execute the method for detecting an open/short circuit on a PCB design layout disclosed herein. Because the technical principle of the system embodiment is similar to the technical principle of the foregoing method embodiment, the technical details of the system 600 are not repeatedly described again.

The system 600 for detecting an open/short circuit on a PCB design layout in this embodiment specifically comprises: a PCB data reading module 601, a connectivity analyzing module 602, an IPC netlist data reading module 603, an open/short circuit detecting module 604, and a check report generation module. The PCB data reading module 601 is configured to perform step S1 described in the foregoing method embodiment, and the connectivity analyzing module 602 is configured to perform steps S2 and S3 described in the foregoing method embodiment. The IPC netlist data reading module 603 is configured to perform step S4 described in the foregoing method embodiment, and the open/short circuit detecting module 604 is configured to perform steps S5 to S7 described in the foregoing method embodiment. The check report generation module is configured to generate a check report.

A person skilled in the art should understand that, all or some of the above modules may be rearranged, or integrated into one or more modules during actual implementation. In addition, the modules may be all implemented in the form of software being invoked by a processing element, or may be all implemented in the form of hardware; or some modules may be implemented in the form of software being invoked by a processing element, and some other modules may be implemented in the form of hardware. For example, the connectivity analyzing module 602 may be a processing element that is independently disposed, or may be integrated in a specific chip for implementation. In addition, the connectivity analyzing module 602 may be stored in a memory in the form of program code, and is invoked by a specific processing element to perform a function of the connectivity analyzing module 602. Implementation of other modules is similar thereto. The processing element may be an integrated circuit and has a capability of signal processing. In an implementation process, steps in the foregoing methods or the foregoing modules can be implemented by using a hardware integrated logical circuit in a processor element, or by using instructions in the form of software.

Figure 7:
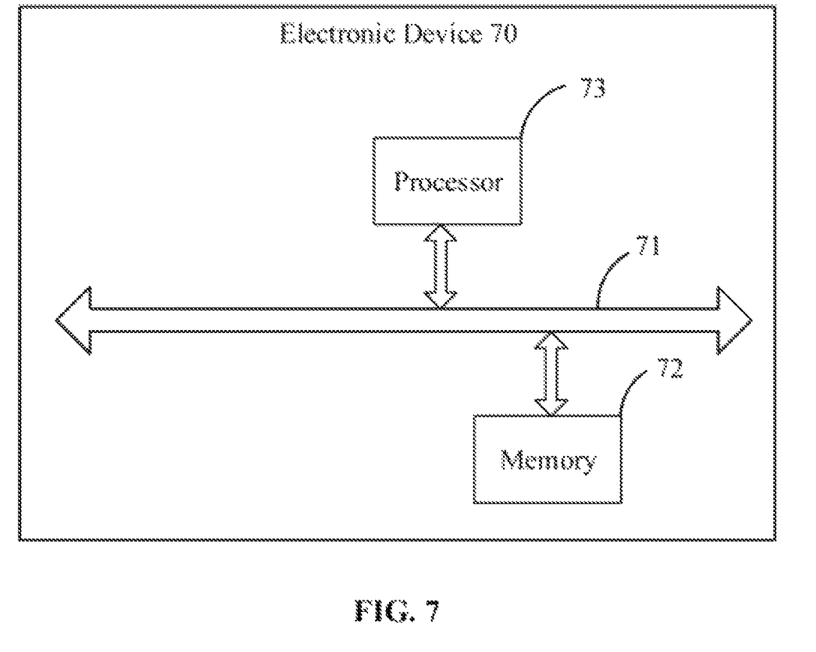
FIG. 7 is a schematic diagram of an electronic device according to an embodiment of the present disclosure.

Referring to FIG. 7, the present disclosure provides an electronic device 70. The electronic device 70 may be a device such as a desktop computer, a portable computer, or a smart phone. Specifically, the electronic device 70 comprises at least a memory 72 and a processor 73 connected through a system bus 71. The memory 72 is configured to store a computer program, and the processor 73 is configured to execute the computer program stored in the memory 72, to perform all or some of the steps in the foregoing method embodiment.

The system bus mentioned above may be a peripheral component interconnect (PCI) bus or an extended industry standard architecture (EISA) bus, or the like.

The system bus may be divided into an address bus, a data bus, a control bus, and the like. For ease of representation, only one bold line is used to represent the bus in the figure, but this does not mean that there is only one bus or only one type of bus. The communication interface is configured to implement communication between a database access apparatus and another device (such as a client, a read/write database, or a read-only database). The memory may comprise a random access memory (RAM) or may further comprise a non-volatile memory, for example, at least one magnetic disk memory.

The foregoing processor may be a general-purpose processor, comprising a central processing unit (CPU), a network processor (NP), or the like; and may further be a digital signal processor (DSP), an application specific integrated circuit (ASIC), a field-programmable gate array (FPGA), or other programmable logic devices, a discrete gate or a transistor logic device, or a discrete hardware component.

In conclusion, the method, system and electronic device for detecting an open/short circuit on a PCB design layout in the present disclosure present disclosure effectively overcomes various shortcomings in the prior art and has high industrial value.

The above embodiments only exemplarily describe the principles and effects of the present invention, and are not intended to limit the present invention. Those skilled in the art may modify and change the embodiments without departing from the spirit and scope of the present invention. Therefore, all modifications and changes completed by those of ordinary skill in the art without departing from the spirit and technical ideas of the present invention should fall within the claims of the present invention.

What is claimed is:

1. A method for detecting an open/short circuit on a printed circuit board (PCB) design layout, comprising:
   reading PCB data of the PCB design layout to be checked, to output an image of each PCB layer in the PCB design layout;
   performing a first connectivity analysis on the image of each PCB layer, to classify pad patterns connected with each other in the same PCB layer into a corresponding child network group;
   performing a second connectivity analysis on each electroplated hole of a drill layer of the PCB design layout, to classify child network groups in which the pad patterns connected by the same electroplated hole running through different PCB layers are, into a corresponding parent network group;
   reading IPC netlist data of the PCB design layout, to obtain a corresponding netlist network group for each pad pattern; and
   determining whether a netlist network relationship of the pad patterns is consistent with a network relationship obtained after the second connectivity analysis; and if the netlist network relationship of the pad patterns is consistent with the network relationship obtained after the second connectivity analysis, determining that there is no open/short circuit in the PCB design layout; or if the netlist network relationship of the pad patterns is inconsistent with the network relationship obtained after the second connectivity analysis, determining that there is an open/short circuit in the PCB design layout.

2. The method according to claim 1, wherein the step of determining whether there is an open/short circuit in the PCB design layout based on the netlist network relationship of the pad patterns and the network relationship obtained after the second connectivity analysis further comprises:
   if the pad patterns in the same netlist network group are not in the same parent network group, determining that there is an open circuit in the PCB design layout and the open circuit occurs in the netlist network group;
   if the pad patterns in the same parent network group are not in the same netlist network group, determining that there is a short circuit in the PCB design layout and the short circuit occurs in the parent network group; or
   if the pad patterns in the same netlist network group are also in the same parent network group or the pad patterns in the same parent network group are also in the same netlist network group, determining that there is no open/short circuit in the PCB design layout.

3. The method according to claim 2, further comprising:
   outputting an image of the IPC netlist data, wherein the IPC netlist data comprises coordinates of each pad pattern;
   searching the IPC netlist data for coordinates of the pad patterns in the network group with the open/short circuit; and
   highlighting positions on the image of the IPC netlist data according to the coordinates found.

4. A non-transitory storage medium storing a computer program, wherein when the computer program is loaded and executed by a processor, a method for detecting an open/short circuit on a printed circuit board (PCB) design layout as mentioned in claim 3 is implemented.

5. An electronic device, comprising:
   a processor; and a memory;
   wherein the memory is configured to store a computer program, and the processor is configured to load and execute the computer program, so that the electronic device executes a method for detecting an open/short circuit on a PCB printed circuit board (PCB) design layout as mentioned in claim 3.

6. The method according to claim 2, further comprising: generating a check report, wherein the check report comprises identification information of each pad pattern, information about the netlist network group in which each pad pattern is, information about the parent network group in which each pad pattern is, and a check result.

7. A non-transitory storage medium storing a computer program, wherein when the computer program is loaded and executed by a processor, a method for detecting an open/short circuit on a printed circuit board (PCB) design layout as mentioned in claim 3 is implemented.

8. An electronic device, comprising:
   a processor; and a memory;
   wherein the memory is configured to store a computer program, and the processor is configured to load and execute the computer program, so that the electronic device executes a method for detecting an open/short circuit on a printed circuit board (PCB) design layout as mentioned in claim 6.

9. A non-transitory storage medium storing a computer program, wherein when the computer program is loaded and executed by a processor, a method for detecting an open/short circuit on a printed circuit board (PCB) design layout as mentioned in claim 2 is implemented.

10. An electronic device, comprising:
    a processor; and a memory;
    wherein the memory is configured to store a computer program, and the processor is configured to load and execute the computer program, so that the electronic device executes a method for detecting an open/short circuit on a printed circuit board (PCB) design layout as mentioned in claim 2.

11. A non-transitory storage medium storing a computer program, wherein when the computer program is loaded and executed by a processor, a method for detecting an open/short circuit on a printed circuit board (PCB) design layout as mentioned in claim 1 is implemented.

12. An electronic device, comprising:
    a processor; and a memory;
    wherein the memory is configured to store a computer program, and the processor is configured to load and execute the computer program, so that the electronic device executes a method for detecting an open/short circuit on a printed circuit board (PCB) design layout as mentioned in claim 1.

13. A system for detecting an open/short circuit on a printed circuit board (PCB) design layout, comprising:
    a PCB data reading module, configured to read PCB data of the PCB design layout to be checked, to output an image of each PCB layer in the PCB design layout;
    a connectivity analyzing module, configured to perform a first connectivity analysis on the image of each PCB layer, to classify pad patterns connected with each other in the same PCB layer into a corresponding child network group; and perform a second connectivity analysis on each electroplated hole of a drill layer of the PCB design layout, to classify child network groups in which the pad patterns connected by the same electroplated hole running through different PCB layers are, into a corresponding parent network group;

an IPC netlist data reading module, configured to read IPC netlist data of the PCB design layout, to obtain a netlist network group in which each pad pattern is; and an open/short circuit detecting module, configured to: determine whether a netlist network relationship of the pad patterns is consistent with a network relationship obtained after the second connectivity analysis; and if the netlist network relationship of the pad patterns is consistent with the network relationship obtained after the second connectivity analysis, determine that there is no open/short circuit in the PCB design layout; or if the netlist network relationship of the pad patterns is inconsistent with the network relationship obtained after the second connectivity analysis, determine that there is an open/short circuit in the PCB design layout.

14. The system according to claim 13, wherein the foregoing implementation method of the open/short circuit detecting module determining whether there is an open/short circuit according to the netlist network relationship of the pad patterns and network relationship after a second connectivity analysis further comprises:

determining that there is an open circuit in the PCB design layout and the open circuit occurs in the netlist network group, when the pad patterns in the same netlist network group are not in the same parent network group;

determining that there is a short circuit in the PCB design layout and the short circuit occurs in the parent network group, when the pad patterns in the same parent network group are not in the same netlist network group; or determining that there is no open/short circuit in the PCB design layout, when the pad patterns in the same netlist network group are also in the same parent network group or the pad patterns in the same parent network group are also in the same netlist network group.

15. The system according to claim 14, wherein the IPC netlist data reading module is further configured to: output an image of the IPC netlist data, wherein the IPC netlist data comprises coordinates of each pad pattern, wherein the system further comprises a highlighting module, configured to:

search the IPC netlist data for coordinates of the pad patterns in the network group with the open/short circuit, and highlight positions on the image of the IPC netlist data according to the coordinates found.

16. The system according to claim 14, further comprising:
a check report generation module, configured to generate a check report, wherein the check report comprises identification information of each pad pattern, information about the netlist network group in which each pad pattern is, information about the parent network group in which each pad pattern is, and a check result.

* * * * *